United States Patent [19]

Stackman et al.

[11] 4,024,102
[45] May 17, 1977

[54] MOLDING COMPOSITION SUITABLE FOR FORMING IMPROVED FLAME RETARDANT THREE-DIMENSIONAL SHAPED ARTICLES

[75] Inventors: Robert W. Stackman, Morristown; Frank M. Berardinelli, Millington, both of N.J.

[73] Assignee: Celanese Corporation, New York, N.Y.

[22] Filed: Feb. 13, 1974

[21] Appl. No.: 442,038

[52] U.S. Cl. .................. 260/40 R; 260/45.75 B; 260/860

[51] Int. Cl.² .................................. C08L 67/02

[58] Field of Search .......... 260/45.75 B, 40 R, 860, 260/DIG. 24, 75 H

[56] References Cited

UNITED STATES PATENTS

| | | | |
|---|---|---|---|
| 3,265,762 | 8/1966 | Quisenberry | 260/860 |
| 3,409,704 | 11/1968 | Bailey | 260/75 H |
| 3,642,724 | 2/1972 | Schmidt et al. | 260/860 X |
| 3,671,487 | 6/1972 | Abolins | 260/40 R |
| 3,748,303 | 7/1973 | Becker et al. | 260/860 X |
| 3,794,617 | 2/1974 | Mains et al. | 260/DIG. 24 |
| 3,814,725 | 6/1974 | Zimmerman et al. | 260/40 R |
| 3,833,685 | 9/1974 | Wambach | 260/DIG. 24 |
| 3,839,140 | 10/1974 | Tyler | 260/75 H X |
| 3,855,277 | 12/1974 | Fox | 260/860 |
| 3,883,611 | 5/1975 | Nelson | 260/860 |

OTHER PUBLICATIONS

Encyclopedia of Polymer Science and Technology, 1967, vol. 7, p. 15 of "Fire Retardancy".

*Primary Examiner*—Sandra M. Person

[57] ABSTRACT

An improved flame retardant molding composition of polypropylene terephthalate or polybutylene terephthalate is provided. The composition includes in intimate admixture with the non-halogenated polypropylene terephthalate or polybutylene terephthalate an oxide of antimony, a reinforcing agent (e.g. a glass fiber reinforcing agent), and a polyalkylene-2,5-dibromoterephthalate. Unlike the flame retardant molding compositions of the prior art, the components of the same tend to be non-exuding during utilization of the resulting three-dimensional shaped article at elevated temperatures (e.g. after 66 hours at 175° C.) and thereby render the same suitable for attractive utilization in an even wider range of applications.

11 Claims, No Drawings

MOLDING COMPOSITION SUITABLE FOR FORMING IMPROVED FLAME RETARDANT THREE-DIMENSIONAL SHAPED ARTICLES

BACKGROUND OF THE INVENTION

Polypropylene terephthalate and polybutylene terephthalate molding resins, along with polyethylene terephthalate were first disclosed in U.S. Pat. No. 2,465,319 to Whinfield and Dickson.

The utilization of polypropylene terephthalate and polybutylene terephthalate as molding resins is becoming increasingly accepted in recent years. For example, polypropylene terephthalate and polybutylene terephthalate can be molded and processed at lower temperatures, have a shorter cycle time in the mold and do not require, as does polyethylene terephthalate, the presence of either a nucleating agent or an internal mold release agent. Reinforced polypropylene terephthalate and polybutylene terephthalate molding resins surprisingly have been found to be superior to similarly reinforced polyethylene terephthalate in many important processing and performance characteristics. Furthermore, reinforced polypropylene terephthalate and polybutylene terephthalate molding resins have correspondingly higher tensile strength, lower water absorption and better creep (flexural) properties than does similarly reinforced polyethylene terephthalate.

Polypropylene terephthalate and polybutylene terephthalate, just as polyethylene terephthalate, however inherently possess the disadvantage of being flammable, and when burning tend to drip a significant quantity of flaming droplets. Such disadvantage limits their use to those applications where this shortcoming can be tolerated.

Various proposals have heretofore been made for reducing the burning characteristics of polypropylene terephthalate and polybutylene terephthalate. See, for instance, U.S. Pat. No. 3,751,396 to John S. Gall, and U.S. Pat. No. 3,624,024 to John R. Caldwell and Marvin A. McCall. It had been proposed, inter alia, to incorporate within the polypropylene terephthalate or polybutylene terephthalate an organic flame retardant additive such as decabromodiphenyl oxide, tetrabromophthalic anhydride, tetrabromobisphenol A diacetate, 3,4,5,6-tetrabromo-N-methylphthalimide, etc. Antimony trioxide may also be included. It has been observed, however, that the polypropylene terephthalate and polybutylene terephthalate molding compositions of the prior art which incorporate the various flame retardant additives heretofore proposed tend to possess properties which interfere with the appearance of molded articles formed from the same in some end use applications. For instance, the flame retardant additives heretofore proposed upon the passage of time tend to separate from the polymeric matrix and to exude from the same at elevated temperatures. The additive may become visually apparent upon the surface of the molded article as a fine powder.

Also, as discussed in U.S. Pat. No. 3,751,396 polypropylene terephthalate and polybutylene terephthalate molding compositions containing the flame retardant additives of the prior art may have a tendency drip flaming particles when subjected to flame. An approach to overcome this deficiency has required the additional incorporation of a supplemental reinforcing agent, such as asbestos, having a length to diameter ratio greater than 50:1.

In our commonly assigned U.S. Ser. Nos. 432,275 and 432,372, filed Jan. 10, 1974, are claimed superior polypropylene terephthalate or polybutylene terephthalate molding compositions which include certain brominated aromatic polyphosphates as the flame retardant additive.

It is an object of the present invention to provide a polypropylene terephthalate or polybutylene terephthalate molding compositions suitable for forming improved flame retardant three-dimensional shaped articles.

It is an object of the present invention to provide a flame retardant polypropylene terephthalate or polybutylene terephthalate molding composition which includes in intimate admixture therewith a flame retardant additive which is non-exuding from the resulting three-dimensional molded article even upon the passage of extended periods of time at elevated temperatures.

It is an object of the present invention to provide a flame retardant polypropylene terephthalate or polybutylene terephthalate molding composition which is capable of forming a molded three-dimensional shaped article which is non-dripping when subjected to flame even in the absence of asbestos.

It is an object of the present invention to provide an improved self-extinguishing polypropylene terephthalate or polybutylene terephthalate molding composition which is capable of forming a three-dimensional shaped article which passes the UL-94 Flammability Test.

These and other objects as well as the scope, nature, and utilization of claimed invention will be apparent from the following detailed description and appended claims.

SUMMARY OF THE INVENTION

It has been found that in a molding composition having flame retardant properties when molded into three-dimensional articles comprising an intimate blend of a. a non-halogenated polyalkylene terephthalate selected from the group consisting of polypropylene terephthalate and polybutylene terephthalate having an inherent viscosity of about 0.2 to about 1.4 deciliters per gram, b. an organic flame retardant additive, c. an oxide of antimony, and d. a reinforcing agent;

improved results are achieved by providing as said organic flame retardant additive a polyalkylene-2,5-dibromoterephthalate having recurring units of the formula

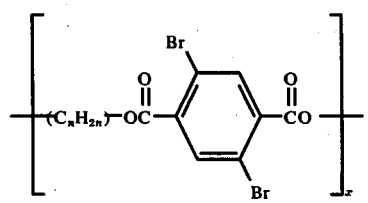

where $n = 2, 3,$ or $4$, and $x =$ about 3 to 25 with said polyalkylene-2,5 dibromoterephthalate exhibiting no propensity to exude from said intimate blend during utilization of a three-dimensional article molded therefrom at an elevated temperature of 175° C. for 66 hours.

DESCRIPTION OF PREFERRED EMBODIMENTS

The primary component of the molding composition is a polyalkylene terephthalate polymer selected from the group consisting of polypropylene terephthalate and polybutylene terephthalate. These polymers which are of the general type described in U.S. Pat. No. 2,465,319 to Whinfield and Dickson, can be produced from the reaction product of a dibasic acid, such as terephthalic acid or a dialkyl ester of terephthalic acid (especially dimethyl terephthalate) and diols having 3 and 4 carbon atoms. Suitable diols include 1,3-propanediol, 1,4-butanediol, 1,3-butanediol, 1,2-propanediol, 1,2-butanediol, 2,3-butanediol, and the like.

In the production of the polypropylene terephthalate or polybutylene terephthalate, the appropriate bis(hydroxyalkyl) terephthalate is produced as the intermediate. The bis(hydroxyalkyl) terephthalate can be prepared by reacting the dialkyl ester of terephthalic acid in which the alkyl radicals can contain from 1 to 7 carbon atoms with about two molecular proportions of the diols described above. It is preferred to use higher proportions of the diol, i.e. in excess of 1.5 moles of the diol per mole of the terephthalate derivative, since by using such proportions, the initial transesterification is caused to take place more rapidly and completely.

The esterification reaction is conducted under conditions of elevated temperatures and atmospheric, subatmospheric, or superatmospheric pressure. Normally, the desired temperature for the polyalkylene terephthalate forming reaction can range from about the boiling temperature of the reaction mixture to as high as 275° C. if desired.

It is recommended that the polypropylene terephthalate or polybutylene terephthalate utilized in the present composition have an inherent viscosity of about 0.2 to 1.4 deciliters per gram, and most preferably an inherent viscosity of about 0.4 to 1.2 deciliters per gram. The inherent viscosity of a given polyalkylene terephthalate sample may be determined at a concentration of 0.1 percent by weight in solvent consisting of 10 parts by weight phenol and 7 parts by weight trichlorophenol. The polypropylene terephthalate or polybutylene terephthalate may be included in the composition of the present invention in a concentration of about 30 to 80 percent by weight based upon the total weight of the composition (e.g. in a concentration of about 40 to 70 percent by weight).

The flame retardant additive utilized in the improved molding composition of the present invention is polymeric in nature and is of considerably higher molecular weight than the non-polymerized organic flame retardant additives heretofore proposed for incorporation in polypropylene terephthalate and polybutylene terephthalate molding compositions intended for use in the production of three-dimensional shaped articles. More specifically, the organic flame retardant additive is a polyalkylene-2,5-dibromoterephthalate having recurring units of the formula

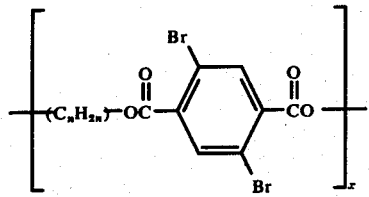

where $n = 2, 3,$ or $4$, and $x =$ about 3 to 25, and most preferably about 5 to 15. The flame retardant additive may be included in the composition of the present invention in a concentration of about 5 to 20 percent by weight based upon the total weight of the composition (e.g. in a concentration of about 10 to 15 percent by weight).

The polyalkylene-2,5-dibromoterephthalate may be formed by any one of a variety of polymerization routes. Polymerization techniques conveniently may be selected which are relatively simple in nature and which require no solvents, acid acceptors, or product washing. The evolution of corrosive vapors during the additive preparation is eliminated, and no purification of the resulting polyalkylene-2,5-dibromoterephthalate is required.

For instance, an appropriate glycol (e.g. ethylene glycol, 1,3-propanediol, 1,2-propanediol, 1,4-butanediol, 1,3-butanediol, 1,2-butanediol, or 2,3-butanediol) may be reacted with 2,5-dibromoterephthalic acid. A bishydroxy alkyl-2,5-dibromoterephthalate intermediate is formed in the presence of sodium hydroxide, and the desired polyalkylene-2,5-dibromoterephthalate subsequently is formed in the presence of a polycondensation catalyst, e.g. antimony trioxide. This route particularly is preferred for the formation of polyethylene-2,5-dibromoterephthalate additive wherein the glycol utilized is ethylene glycol. Alternatively, in the production of the polyethylene-2,5-dibromoterephthalate the bishydroxy ethyl-2,5-dibromoterephthalate intermediate may be formed by the reaction of ethylene oxide and 2,5-dibromoterephthalatic acid.

In another representative synthesis route the polyalkylene-2,5-dibromoterephthalate additive may be formed via a procedure analogous to that commonly utilized for the formation of the non-halogenated polyalkylene terephthalate. Dimethyl-2,5-dibromoterephthalate may be reacted with an appropriate glycol in the presence of a catalyst, such as a titanium/silicon catalyst. Methanol is initially displaced by the glycol and the polymerization reaction subsequently is carried out. This route particularly is preferred for the formation of polypropylene-2,5-dibromoterephthalate and polybutylene-2,5-dibromoterephthalate wherein the glycol utilized is 1,3-propanediol, and 1,4-butanediol respectively.

As will be apparent to those skilled in the art, other end capping groups may be introduced into the polymer additive molecule instead of those end groups inherently formed by the specific synthesis route selected without departing from the concept of the present invention. It is the recurring units of the polymeric flame retardant additive which are of prime importance in the present invention.

The third essential component of the molding composition in accordance with the present invention is an oxide of antimony, e.g. antimony trioxide ($Sb_2O_3$) or antimony pentoxide ($Sb_2O_5$). This component preferably is provided as a finely divided powder and serves in conjunction with the polyalkylene-2,5-dibromoterephthalate heretofore described to impart a high degree of flame retardancy to the resulting molding composition. The antimony trioxide component is sometimes identified as antimony white, or antimony oxide. The antimony pentoxide component is sometimes identified as antimonic anhydride, antimonic acid or stibic anhydride. The oxide of antimony may be included in the composition of the present invention in a concentration of about 2 to 7 percent by weight based upon the total weight of the composition (e.g. in a concentration of about 3 to 6 percent by weight).

The fourth essential component of the molding composition in accordance with the present invention is a reinforcing agent. A reinforcing agent may be present in concentration of about 2 to about 60 percent by weight based upon the total weight of the composition (e.g. in a concentration of about 5 to about 40 percent by weight or 20 to 40 percent by weight). Representative reinforcing agents include glass fibers, asbestos fibers, cellulosic fibers, cotton fibers, synthetic polymeric fibers, inorganic or metallic powders, acicular calcium metasilicate (see U.S. Pat. No. 3,764,576), and the like. The particularly preferred reinforcing agent is glass fiber, which may be chopped in lengths of about 1/16 inch or shorter to ¼ inch or longer. The preferred length for the glass fiber reinforcement is about ⅛ to 3/16 inch. Minor quantities of other additives for appearance and property improvement additionally may be incorporated in the molding composition, such as colorants, plasticizers, stabilizers, hardeners, coupling agents, and the like. As discussed hereafter it is not essential that asbestos fiber be included in the composition to obtain a molding composition exhibiting non-dripping characteristics when molded into thin sections (see U.S. Pat. No. 3,751,396).

It has been found that a preferred fiber reinforced molding composition in accordance with the present invention comprises an intimate blend of about a. 40 to 70 percent by weight polybutylene terephthalate having an interest viscosity of about 0.4 to 1.2 deciliters per gram, b. 10 to 15 percent by weight of a polyalkylene-2,5-dibromoterephthalate of the formula

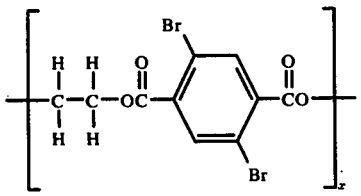

where $x =$ about 3 to 25, c. about 3 to 6 percent by weight of an oxide of antimony, and d. about 20 to 40 percent by weight of glass fiber reinforcing agent, with the composition when molded (1) being self-extinguishing and non-dripping when subjected to the UL-94 Flammability Test, and (2) showing no propensity for any component thereof to exude from the same at an elevated temperature of 175° C. for 66 hours.

The components of the improved molding composition may be admixed to form the desired intimate blend by either dry blending or melt blending. The blending may be carried out through the use of extruders, heated rolls, or other types of mixers, as will be apparent to those skilled in the art. For instance, the components may be tumble blended and melt extruded at 240° to 270° C. for pelletizing.

The molding composition of the present invention may be readily molded to form three-dimensional shaped articles of satisfactory mechanical properties using conventional molding techniques commonly utilized for polypropylene terephthalate and polybutylene terephthalate. Either compression or injection molding procedures may be utilized. It is preferably that the molding technique utilized not result in any substantial fracture of the reinforcing agent.

The composition of the present invention when molded into a three-dimensional shaped article is particularly suited for use in applications where a high degree of flame retardant properties is essential and the usual exudation at an elevated temperature of the flame retardant additives heretofore incorporated in polypropylene terephthalate and polybutylene terephthalate is considered undesirable. For instance, the compositions of the present invention are particularly suited for use in high temperature electrical applications, distributor caps, terminal blocks, miscellaneous automotive under-the-hood applications, etc. Three-dimensional molded articles formed from the composition may be utilized in high temperature environments, e.g. at 140° to 200° C.

It has been found that the polyalkylene terephthalate, polyalkylene-2,5-dibromoterephthalate, and the oxide of antimony components of the molding composition surprisingly exhibit a high degree of compatibility and may be compounded with ease. No exudation of components from a shaped article formed from the same is observed at ambient conditions. Molded articles even may be utilized for prolonged periods at elevated temperatures, e.g. up to about 175° C., or more, without exudation. A simple test for the presence or absence of exudation at elevated temperatures may be simply conducted by heating a reinforced molded article in an air atmosphere at 175° C. for 66 hours, and the article subsequently observed. The molded articles formed from the composition additionally exhibit satisfactory strength properties.

The superiority of the resulting glass fiber reinforced three-dimensional shaped articles may be confirmed via the standard UL-94 Flammability Test as previously mentioned. For instance, a bar of 4 inches × ½ inch × 1/16 inch may be formed by injection molding. The molded article is vertically mounted in a clamp, and a cotton pad is placed 12 inches below the bottom edge of the article. A ¾ inch blue flame from a natural gas Bunsen burner is applied to the lower edge of the article for 10 seconds, the burner is removed and flame-out time is determined, the flame immediately is reapplied for 10 seconds, and the flame is removed and flame-out time is again determined. In order for the article to pass this test is must: (a) not have any article burn for more than 10 seconds after each application of the flame, (b) not have a total flaming time exceeding 50 seconds for a set of 5 articles, and (c) have no molten drippings ignite the cotton pad.

For the purpose of the present description a given molded article is considered to be "non-dripping" when in accordance with the above test no burning droplets are observed when the flame is removed. For the purpose of the present description a given molded article is considered to be "self-extinguishing" when in accordance with the above test it does not burn longer than 10 seconds when the flame is removed.

The following examples are given as specific illustrations of the claimed invention. It should be understood, however, that the invention is not limited to the specific details set forth in the examples.

In each example the polybutylene terephthalate component is formed via the procedure described in U.S. Pat. No. 2,465,319 to Whinfield and Dickson. More specifically, 4 parts by weight dimethylterephthalate and 3 parts by weight 1,4-butanediol are mixed together in the presence of 0.0004 part titanium/silicon catalyst. The polybutylene terephthalate has an inherent viscosity of 0.7 deciliters per gram determined at a concentration of 0.1 percent by weight in a solvent which is a mixture of 10 parts by weight phenol and 7 parts by weight trichlorophenol.

EXAMPLE I

Polyethylene-2,5-dibromoterephthalate is selected as polyalkylene-2,5-dibromoterephthalate.

200 parts by weight of 2,5-dibromoterephthalic acid and 94 parts by weight ethylene glycol are reacted in the presence of 0.1 part by weight sodium hydroxide. The sodium hydroxide serves inter alia to prevent the formation of polyglycols and to control the pH. The reactants are heated to 200° C. at reflux conditions and are maintained under reflux for about 2 hours during which time the 2,5-dibromoterephthalic acid dissolves in the ethylene glycol and bishydroxyethyl-2,5-dibromoterephthalate is formed. 0.1 part by weight antimony trioxide is added as a condensation catalyst, and the temperature of the reaction mixture is raised to 250° C. over ½ hour. The pressure of the reaction zone is reduced to 1 mm Hg and the contents are maintained at that temperature for 2 hours during which time ethylene glycol is removed by distillation as the polymerization reaction proceeds. The reduced pressure is next released through the introduction of nitrogen, the reaction mixture cooled, and the polymer recovered as a tan glassy solid having a softening point of about 75° to 80° C. The polymer is ground and slurried with methylene chloride at room temperature for 15 minutes wherein solvent crystallization of the polymer takes place. The polymer additive is next separated from the methylene chloride. The resulting polyethylene-2,5-dibromoterephthalate additive exhibits the foregoing formula where $n = 2$, and $x = 4$, and has end groups attached to the recurring units illustrated consisting primarily of —OH, and —OCH$_2$CH$_2$OH. The additive has an inherent viscosity of 0.1 deciliters per gram determined at a concentration of 0.1 percent by weight in a solvent which is a mixture of 10 parts by weight phenol and 7 parts by weight trichlorophenol, and has a bromine content of about 45 percent by weight.

Three-dimensional shaped articles are formed comprising 53.2 percent by weight polybutylene terephthalate, 13.1 percent by weight of the polyethylene-2,5-dibromoterephthalate additive, 3.7 percent by weight antimony trioxide, and 30 percent by weight of 3/16 inch glass fiber. No asbestos is included. The shaped articles exhibit satisfactory mechanical properties.

The components are formed into an intimate blend by tumble blending the dry components, melt extruding at 240° to 250° C., and pelletizing. The articles are injection molded into bars of 4 inches × ½ inch × 1/16 inch using a melt temperature of 260° C. a mold temperature of 65° C., and an injection pressure of 7,000 psi. The components of the molded articles are found to be non-exuding from the resulting three-dimensional shaped articles after 66 hours at 175° C., and indefinitely at ambient conditions. The molded articles are non-dripping and self-extinguishing and pass the UL-94 Flammability Test.

For comparative purposes both the polyethylene-2,5-dibromoterephthalate and the antimony trioxide components are omitted from the blend. The resulting molded articles burn vigorously until totally consumed and drip burning droplets which ignite the cotton pad in the UL-94 Flammability Test.

For comparative purposes only the polyethylene-2,5-dibromoterephthalate is omitted from the blend. The resulting molded articles burn vigorously until totally consumed and drip burning droplets which ignite the cotton pad in the UL-94 Flammability Test.

For comparative purposes only the antimony trioxide component is omitted from the blend. The resulting molded articles burn vigourously until totally consumed and drip burning droplets which ignite the cotton pad in the UL-94 Flammability Test.

For comparative purposes molded control articles are formed utilizing representative flame retardant technology of the prior art. The molded articles comprise 57.8 percent by weight polybutylene terephthalate, 4.8 percent by weight decabromobiphenyl oxide, 4.8 percent by weight antimony trioxide, 30 percent by weight of ⅛ inch glass fiber and 2.6 percent by weight of 5-25 microns asbestos fiber. The decabromobiphenyl oxide component of the resulting three-dimensional shaped articles is found substantially to exude onto the surface of the article after 66 hours at 175° C. The molded articles are non-dripping and self-extinguishing and pass the UL-94 Flammability Test. If the asbestors component is omitted from the control, then the molded article will drip a substantial quanitity of burning droplets, and may fail the UL-94 Flammability Test by igniting the cotton pad.

EXAMPLE II

Polypropylene-2,5-dibromoterephthalate is selected as the polyalkylene-2,5-dibromoterephthalate.

The polypropylene-2,5-dibromoterephthalate is formed via a procedure analogous to that described in U.S. Pat. No. 2,465,319 to Whinfield and Dickson. More specifically, 352 parts by weight dimethyl-2,5-dibromoterepathalate and 114 parts 1,3-propanediol are mixed together in the presence of 0.04. part titanium/silicon catalyst. The reactants are heated to 200° C. while methanol is displaced by 1,3-propanediol and evolved. When methanol evolution has ended the temperature of the reaction mixture is raised to 250° C. over ½ hour. The pressure of the reaction zone is reduced to 1 mm Hg and the contents are maintained at that temperature for 2 hours during which time 1,3-propanediol is removed by distillation as the polymerization reaction procedes. The pressure is next released through the introduction of nitrogen, the reaction mixture cooled, and the polymer recovered. The resulting polypropylene-2,5-dibromoterephthalate additive exhibits the foregoing formula where $n = 3$, and $x = 10$, and has end groups attached to the recurring units illustrated consisting primarily of —OH, and —OCH$_2$CH$_2$CH$_2$OH. The additive has an inherent viscosity of 0.2 deciliters per gram determined at a concentration of 0.1 percent by weight in a solvent which is a mixture of 10 parts by weight phenol and 7 parts by weight trichlorophenol.

Three-dimensional shaped articles are formed as described in Example I with the polypropylene-2,5-dibromoterephthalate additive being substituted for the polyethylene-2,5-dibromoterephthalate additive. Substantially similar results are achieved.

EXAMPLE III

Polybutylene-2,5-dibromoterephthalate is selected as the polyalkylene-2,5-dibromoterephthalate.

The polybutylene-2,5-dibromoterephthalate is formed as described in Example II with the exception that 135 parts by weight 1,4-butanediol are substituted for the 1,3-propanediol. The resulting polybutylene-2,5-dibromoterephthalate additive exhibits the foregoing formula where $n = 4$ and $x = 6$, and has end groups attached to the recurring units illustrated consisting primarily of -OH, and -OCH$_2$CH$_2$CH$_2$CH$_2$OH. The additive has an inherent viscosity of 0.15 deciliters per gram determined at a concentration of 0.1 percent by weight in a solvent which is a mixture of 10 parts by weight phenol and 7 parts by weight trichlorophenol.

Three-dimensional shaped articles are formed as described in Example I with the polybutylene-2,5-dibromoterephthalate being substituted for the polyethylene-2,5-dibromoterephthalate additive. Substantially similar results are achieved.

Also, substantially similar results are obtained when non-halongeated polypropylene terephthalate is substituted for non-halogenated polybutylene terephthalate and/or antimony pentoxide is substituted for antimony trioxide in Examples I, II, or III.

Although the invention has been described with preferred embodiments it is understood that variations and modifications may be resorted to as will be apparent to those skilled in the art. Such variations and modifications are to be considered within the purview and scope of the claims appended hereto.

We claim:

1. A molding composition having flame retardant properties when molded into three-dimensional articles comprising a physical admixture of
   a. about 30 to 80 percent by weight of a non-halogenated polyalkylene terephthalate selected from the group consisting of polypropylene terephthalate and polybutylene terephthalate having an inherent viscosity of about 0.2 to about 1.4 deciliters per gram,
   b. about 2 to 7 percent by weight of an oxide of antimony,
   c. about 2 to 60 percent by weight of a reinforcing agent, and
   d. as an organic flame retardant additive about 5 to 20 percent by weight of a polyalkylene-2,5-dibromoterephthalate consisting of recurring units of the formula

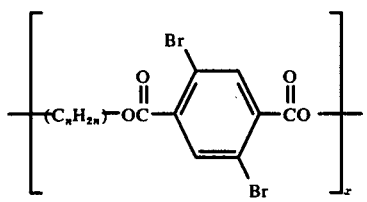

where $n = 2$, 3 or 4, and $x =$ about 3 to 25, with said polyalkylene-2,5-dibromoterephthalate exhibiting no propensity to exude from said physical admixture during utilization of a three-dimensional article molded therefrom at an elevated temperature of 175° C. for 66 hours and with said composition when molded being self-extinguishing and non-dripping when subjected to the UL-94 Flammability Test.

2. An improved molding composition according to claim 1 wherein said non-halogenated polyalkylene terephthalate is polybutylene terephthalate.

3. An improved molding composition according to claim 1 wherein said non-halogenated polyalkylene terephthalate is polypropylene terephthalate.

4. An improved molding composition according to claim 1 wherein said non-halogenated polyalkylene terephthalate has an inherent viscosity of about 0.4 to 1.2 deciliters per gram.

5. An improved molding composition according to claim 1 wherein in said formula for the recurring units of said polyalkylene-2,5-dibromoterephthalate $n = 2$.

6. An improved molding composition according to claim 1 wherein said composition includes about 20 to 40 per cent by weight of glass fiber reinforcing agent based upon the total weight of said composition.

7. An improved molding composition according to claim 1 wherein $x$ in the formula of said polyalkylene-2,5-dibromoterephthalate is about 5 to 15.

8. A molding composition capable of forming improved flame retardant three-dimensional shaped articles comprising a physical admixture
   a. 40 to 70 percent by weight polybutylene terephthalate having an inherent viscosity of about 0.4 to 1.2 deciliters per gram,
   b. 10 to 15 percent by weight of a polyalkylene-2,5-dibromoterephthalate consisting of recurring units of the formula

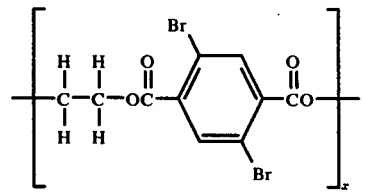

where $x =$ about 3 to 25,
   c. about 3 to 6 percent by weight of an oxide of antimony, and
   d. about 20 to 40 percent by weight of glass fiber reinforcing agent, with said composition when molded (1) being self-extinguishing and non-dripping when subjected to the UL-94 Flammability Test, and (2) showing no propensity for any component thereof to exude from the same during utilization at an elevated temperature of 175° C. for 66 hours.

9. An improved molding composition according to claim 8 wherein $x$ in the formula of said polyalkylene-2,5-dibromoterephthalate is about 5 to 15.

10. An improved molding composition according to claim 8 which is free of asbestos.

11. An improved three-dimensional shaped article molded from the composition of claim 8 which (1) is self-extinguishing and non-dripping when subjected to the UL-94 Flammability Test, and (2) shows no propensity for any component thereof to exude from the same at an elevated temperature of 175° C. for 66 hours.

* * * * *